(12) United States Patent
Han et al.

(10) Patent No.: US 7,865,149 B2
(45) Date of Patent: Jan. 4, 2011

(54) ON CHIP MOS TRANSMIT / RECEIVE SWITCH

(75) Inventors: Yiping Han, La Jolla, CA (US); Arya Reza Behzad, Poway, CA (US)

(73) Assignee: Broadcom Corporation, Irvine, CA (US)

( * ) Notice: Subject to any disclaimer, the term of this patent is extended or adjusted under 35 U.S.C. 154(b) by 792 days.

(21) Appl. No.: 11/762,790

(22) Filed: Jun. 14, 2007

(65) Prior Publication Data

US 2008/0299913 A1 Dec. 4, 2008

Related U.S. Application Data

(60) Provisional application No. 60/941,549, filed on Jun. 1, 2007.

(51) Int. Cl.
H04B 1/44 (2006.01)
H04B 1/28 (2006.01)
H04M 1/00 (2006.01)

(52) U.S. Cl. .......................... 455/73; 455/78; 455/333; 455/550.1

(58) Field of Classification Search .................. 455/78, 455/80, 82, 83, 88, 333, 550.1, 552.1, 553.1
See application file for complete search history.

(56) References Cited

U.S. PATENT DOCUMENTS

| | | | |
|---|---|---|---|
| 6,195,535 B1 * | 2/2001 | Kurchuk | 455/83 |
| 6,882,829 B2 * | 4/2005 | Mostov et al. | 455/83 |
| 7,251,459 B2 * | 7/2007 | McFarland et al. | 455/101 |
| 7,269,392 B2 * | 9/2007 | Nakajima et al. | 455/83 |
| 7,324,790 B2 * | 1/2008 | Hyunh et al. | 455/78 |
| 7,515,882 B2 * | 4/2009 | Kelcourse et al. | 455/78 |
| 2004/0259505 A1 * | 12/2004 | Vasanth | 455/78 |
| 2005/0136847 A1 * | 6/2005 | Matsui et al. | 455/78 |
| 2005/0143020 A1 * | 6/2005 | Ren et al. | 455/83 |
| 2006/0281418 A1 * | 12/2006 | Huang et al. | 455/78 |
| 2007/0004372 A1 * | 1/2007 | Adams et al. | 455/333 |
| 2007/0066245 A1 * | 3/2007 | Snider | 455/78 |
| 2007/0232241 A1 * | 10/2007 | Carley et al. | 455/83 |

\* cited by examiner

*Primary Examiner*—Simon D Nguyen
(74) *Attorney, Agent, or Firm*—Garlick Harrison & Markison; Bruce E. Garlick

(57) ABSTRACT

On-chip MOS circuitry couples a communication path between an output stage amplifier and an output port and disables a circuit path between an input amplifier and the output port by creating a high impedance circuit during transmit operations. Alternatively, the circuitry opens the transmit circuit path with an isolated MOSFET and enables the second circuit path by creating an impedance matched circuit. The switch is formed within an isolated region to allow it to float with a signal to avoid breakdown. This floating MOS switch can be used for a variety of other applications in addition to its use as a transmit/receive switch even though formed on the same die as the communication circuitry.

28 Claims, 10 Drawing Sheets

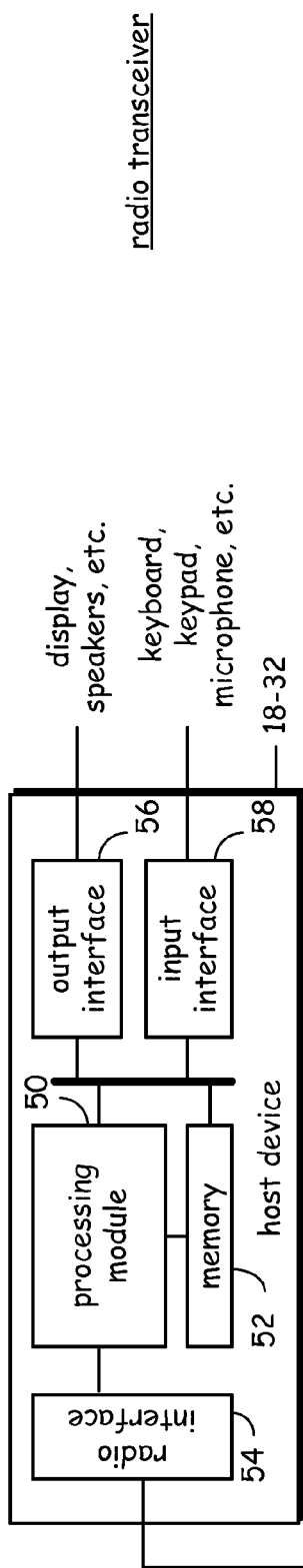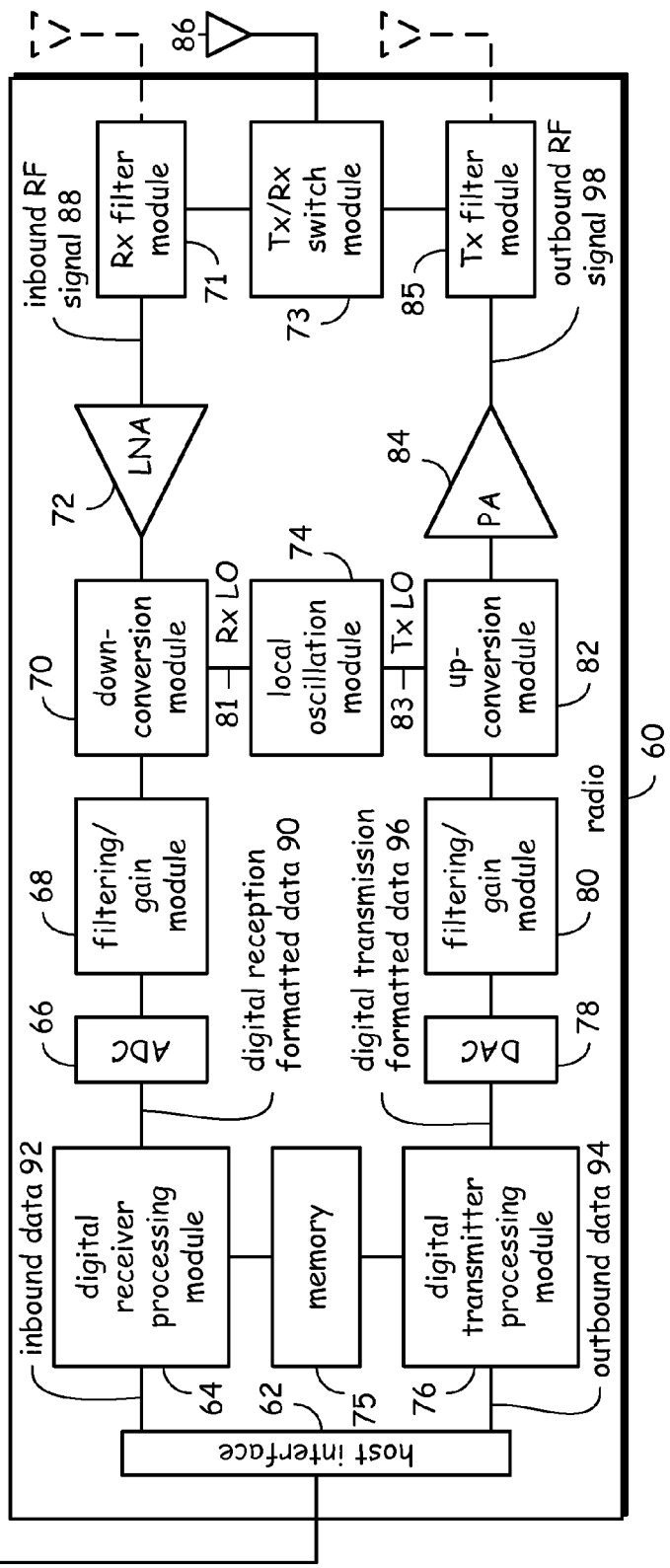
FIG. 2 integrated circuit radio transceiver in transmit mode operations integrated circuit radio transceiver in receive mode operations transmit-receive mode operations

ON CHIP MOS TRANSMIT / RECEIVE SWITCH

CROSS REFERENCE TO RELATED PATENTS

This U.S. application for patent claims the benefit of the filing date of U.S. Provisional Patent Application having Ser. No. 60/941,549, filed on Jun. 1, 2007, which is incorporated herein by reference for all purposes.

BACKGROUND

1. Technical Field

The present invention relates to wireless communications and, more particularly, to circuitry for wireless communications.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

Prior art radio transceiver systems have typically included a number of separate circuits that jointly operate as a radio. For example, a baseband processor, a radio front end, a power amplifier and a transmit-receive switch have all been made as separate and discrete devices. As the trend towards miniaturization of electronics continues, however, it is desirable to determine an approach to consolidate such transceiver elements into a single integrated circuit. The reason this has not occurred in the past, however, relates to power and or voltage requirements for the specific transceiver elements. For example, a typical integrated circuit element has a low breakdown voltage. Typical designs for some of these transceiver elements, however, require that specific components be able to withstand higher breakdown voltages than a typical device in an integrated circuit is able to withstand. As such, it is desirable to develop designs for such transceiver elements that satisfy operational requirements but that may also be implemented on-chip with other integrated circuit components.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIGS. 2 and 3 are schematic block diagrams illustrating a wireless communication host device and an associated radio according to two embodiments of the invention;

DETAILED DESCRIPTION OF THE DRAWINGS

Figure 1:
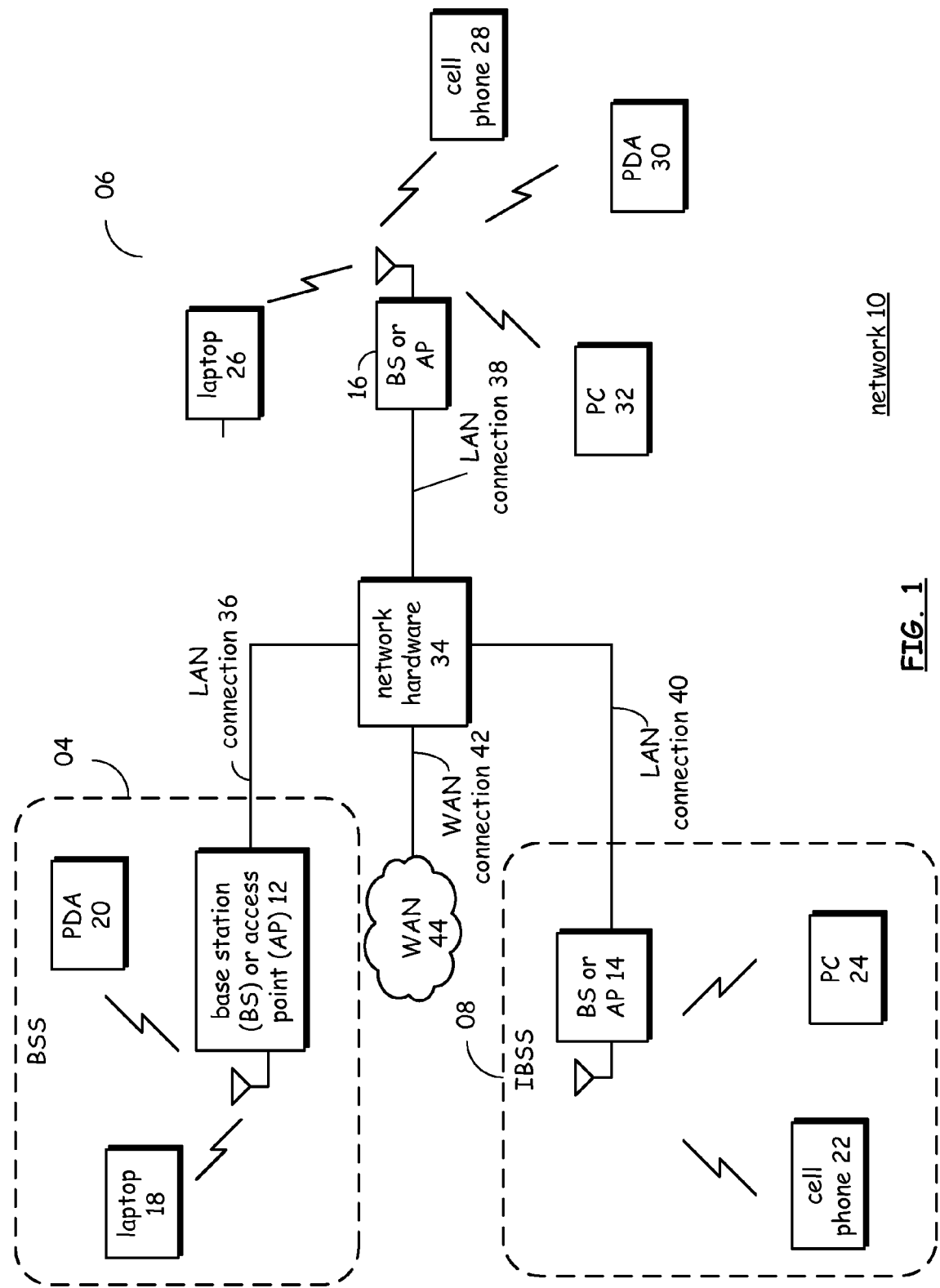
FIG. 1 is a schematic block diagram illustrating a wireless communication device that includes a host device and an associated radio.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIGS. 2-9.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network (WAN) connection 42 for the communication system 10 to an external network element such as WAN 44. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

FIG. 2 is a schematic block diagram illustrating a wireless communication host device 18-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 18-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 18-32 via host interface 62. Host interface 62 routes outbound data 94 to digital transmitter processing module 76, which processes outbound data 94 in accordance with a particular wireless communication standard or protocol (e.g., IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 18-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

Figure 3:
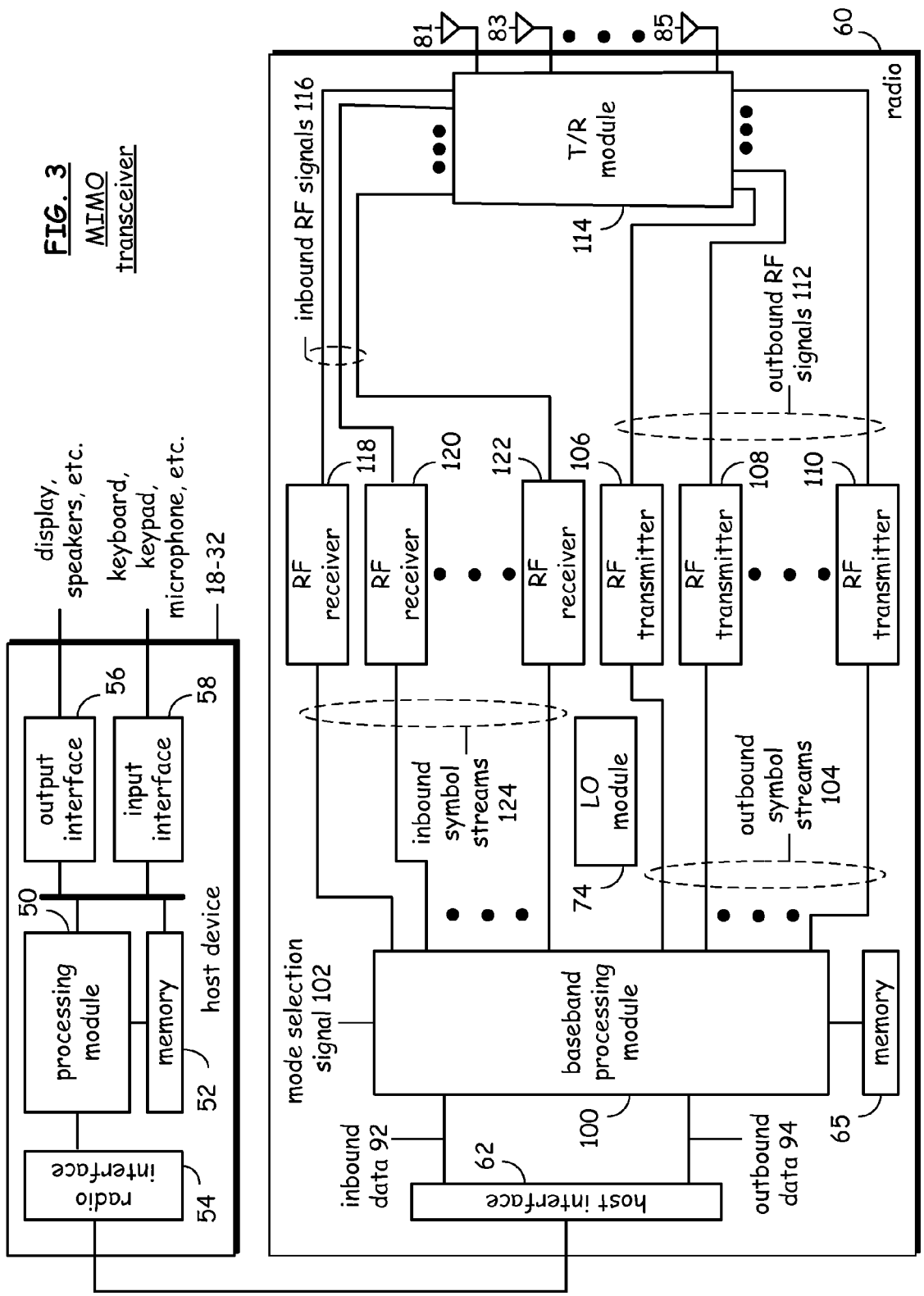

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
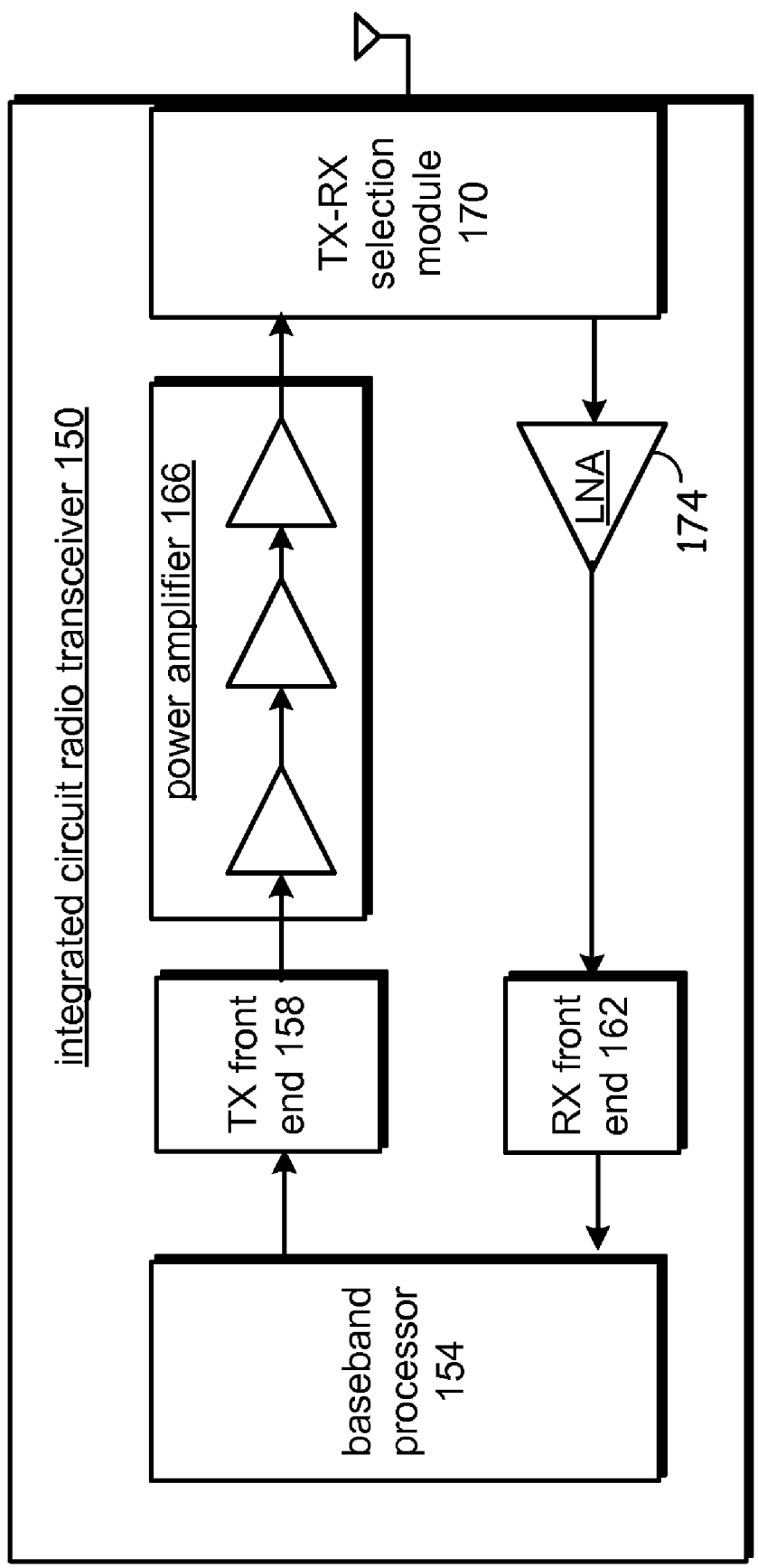
FIG. 4 is a functional block diagram of an integrated circuit radio transceiver according to one embodiment of the invention that includes transmit-receive switch circuitry.

FIG. 4 is a functional block diagram of an integrated circuit radio transceiver according to one embodiment of the invention that includes transmit-receive switch circuitry. The integrated circuit radio transceiver 150 includes a baseband processor 154 that is operable to generate outgoing digital signals and to receive and process ingoing digital signals. The outgoing digital signals are produced to transmit front end 158 and are received from receive front end 162. Transmit front end 158 is operably disposed to receive the outgoing digital signals from the baseband processor, to convert the outgoing digital signals to an analog or continuous waveform, and amplify and upconvert the continuous waveform signals to radio frequency. The outgoing radio frequency (RF) signals are produced by transmit front end 158 to power amplifier 166 which is operable to increase the transmission power a desired amount. Power amplifier 166 is operably disposed to produce amplified outgoing RF signals to transmit-receive switch module 170. Transmit-receive switch module 170 is operable to selectively radiate outgoing RF signals from a coupled antenna or, alternatively, to selectively produce ingoing RF signals received at the coupled antenna to low noise amplifier 174.

Transmit-receive switch module 170 includes logic to couple power amplifier 166 to produce the amplified outgoing RF to the antenna and to effectively disable a communication path between the antenna and low noise amplifier to protect the low noise amplifier at the same time 174 or, alternatively, to disable power amplifier 166 from producing the amplified outgoing RF signal to the antenna and to enable communications from the antenna to the low noise amplifier 174 and to eliminate the load effect from the on-chip power amplifier at the same time. One aspect of one embodiment of integrated circuit radio transceiver 150 is that both the power amplifier 166 and the transmit-receive switch module 170 are both formed on the same integrated circuit as the transmit and receive radio front end circuitry.

Figure 5:
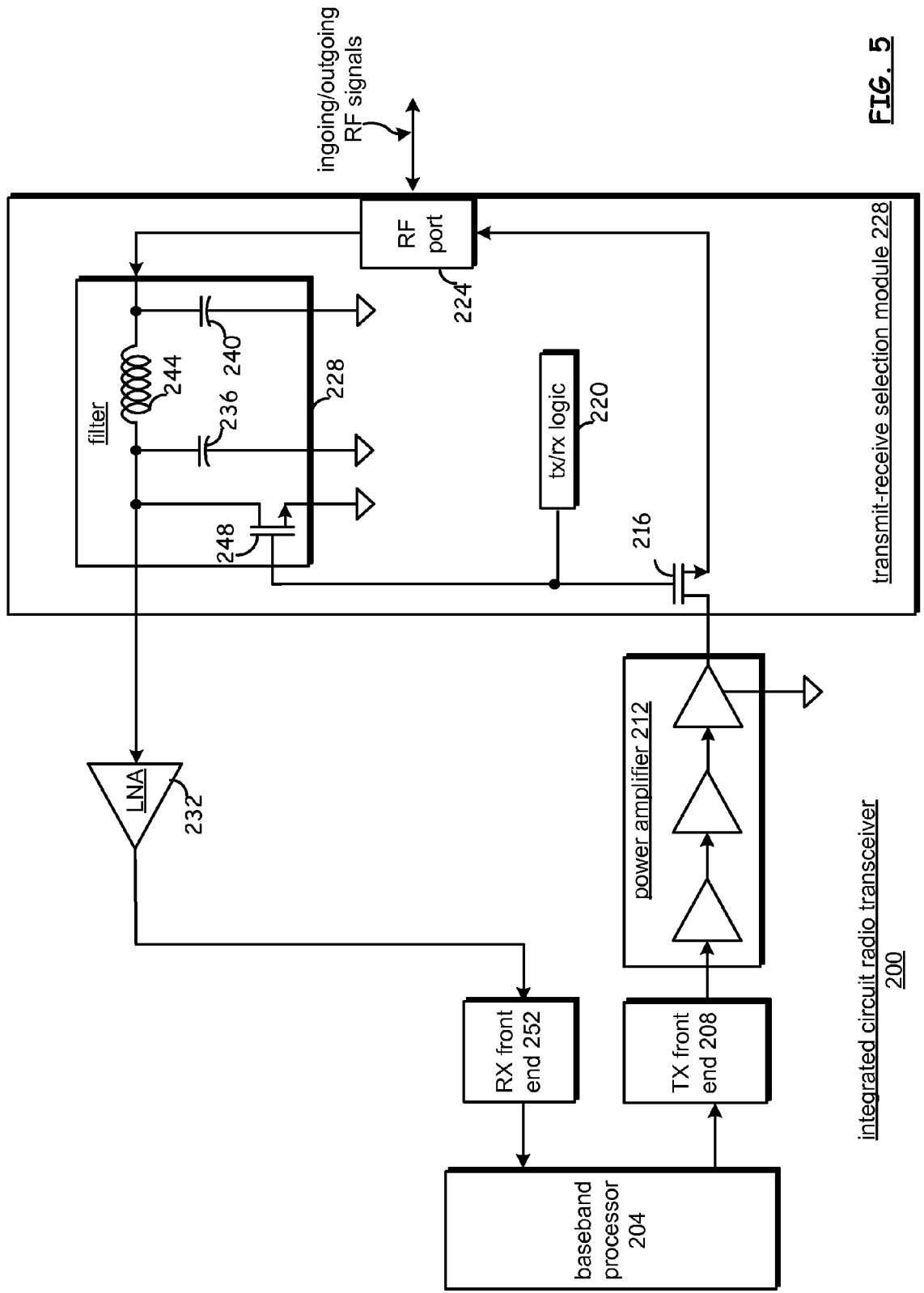
FIG. 5 is a functional schematic diagram of an integrated circuit radio transceiver according to one embodiment of the invention.

FIG. 5 is a functional schematic diagram of an integrated circuit radio transceiver according to one embodiment of the invention. Integrated circuit radio transceiver 200 includes baseband processor 204 that produces outgoing digital signals to transmit front end 208 which in turn produces outgoing RF to power amplifier 212. Power amplifier 212 is a three stage amplifier module in the described embodiment. The output of power amplifier 212 is produced to an input terminal of an electrically controllable switch. In the described embodiment, the electrically controllable switch is an N type MOSFET 216. A drain of MOSFET 216 is operably disposed to receive the amplified output of amplifier 212. MOSFET 216 is further coupled to receive a logic signal produced by transmit-receive logic 220 as a bias signal to operationally bias MOSFET 216 into an operational state to effectively close the switch and to produce the amplified output at the source of MOSFET 216 to a radio frequency (RF) port 224. RF port 224 may be nothing more than a connector for an antenna or even a mere antenna. In one specific embodiment, RF port 224 comprises an integrated antenna formed on chip with the transmit/receive module for very high frequency communications of at least 20 GHz. Because antenna sizing must be very small to be integrated on a metal layer of a bare die, the associated communication frequency is very high. Alternately, RF port 224 may be a communication port operable to transmit or receive radio frequency communication signals. For example, the RF port may comprise a communication port coupled to a wired transmission line for a high power wired communications.

RF port 224 is also coupled to a configurable filter 228 that operably couples RF port 224 to a low noise amplifier 232 in a receive mode of operation. Filter 228 also is operable to decouple RF port 224 from low noise amplifier 232 by creating a very high impedance topology during the transmit mode of operation. Transmit-receive logic 220 generates a logic signal that reflects whether the radio transceiver is in a transmit or a receive mode of operation. Based upon a logic state of the logic signal produced by transmit-receive logic 220 being equal to a logic "1", switch 216 is either opened or closed because a logic "1" signal operably biases switch 216 into an operational state which effectively is a closed position. Additionally, based upon the logic "1" output of logic 220, filter 228 is configured into a high impedance state to steer any current or signal away from filter 228.

More specifically, filter 228 comprises capacitive elements 236 and 240 and inductive element 244 configured in a Pi-Match network configuration as shown. As may further be seen, a MOSFET 248 is operably coupled as a switch across capacitive element 236 and, when on, shorts capacitive element 236 and couples inductive element 244 to circuit common. As may further be seen, MOSFETs 216 and 248 are biased into an operational state on the same logic signal produced by transmit-receive logic 220. Thus, when switch 216 is on during a transmit mode of operation, the output of power amplifier 212 is operably coupled to RF port 224 while the input the LNA (of the receive path) is grounded which provide the protection for the input LNA effectively. Further, in this mode, the Pi-Match network becomes an impedance-up-conversion match network providing very high impedance to any signal at the antenna. As such, any signal produced by power amplifier 212 is radiated and is not conducted to circuit common or to LNA 232 which improves the insertion loss of transmit-receive switch module 170 using in transmitter mode significantly.

Conversely, when MOSFETs 216 and 248 are off based upon the logic state of the signal produced by transmit-receive logic 224, filter 252 resumes a Pi-Match network topology having a matched impedance for a frequency of interest and signals received at the antenna are conducted to LNA 232. For example, in one embodiment, the matched impedance value at the specified frequency of interested is equal to 50 ohms. LNA 232 then produces an amplified ingoing RF signal to RX front end 252 for down-conversion to one of baseband or an intermediate frequency, for amplification and filtering and for conversion to a digital form for processing by baseband processor 204.

The values of inductive element 244 and capacitive element 240 are selected to resonate when coupled in parallel whenever inductive element 244 is coupled to circuit common and in parallel to capacitive element 240 (which is also connected to circuit common). As such, MOSFET 248 is biased on by logic 220 during a transmit mode of operation, no signal flows from RF port 224 to LNA 232. From the perspective of the antenna, the parallel combination of inductive element 244 and capacitive element 240 creates a very high impedance that operably steers any signal at the antenna away from filter 228 towards RF port 224 for radiation.

Figure 6:
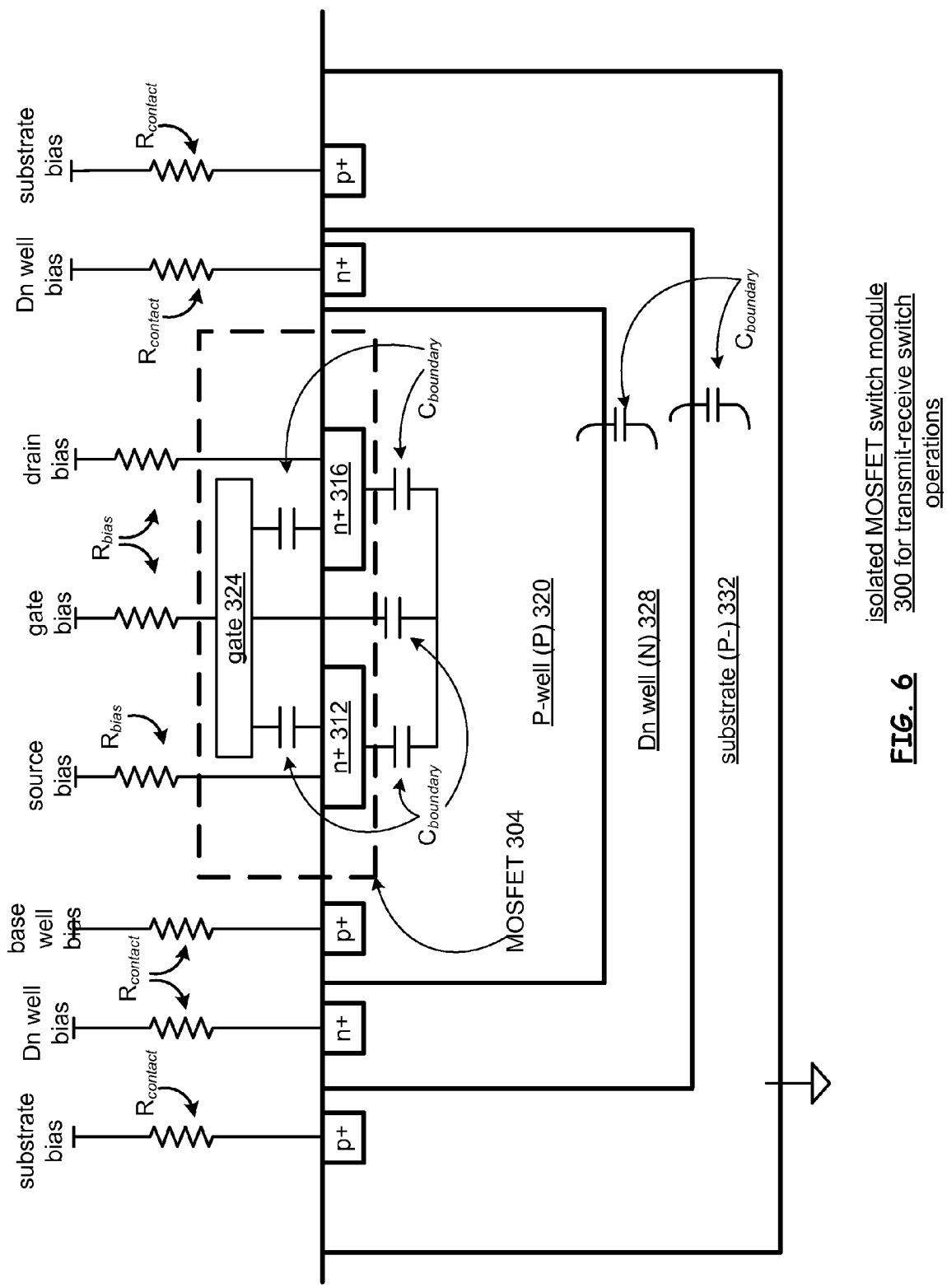
FIG. 6 is a functional block diagram that illustrates formation and use of an N type MOSFET switch in a bulk substrate well for decoupling a power amplifier from an antenna according to one embodiment of the invention.

One aspect of the embodiment of FIG. 5 is that control for transmit and receive operations is based upon on-chip transistors made with routine low breakdown voltage characteristics. In contrast to prior art designs for transmit-receive switches which are off chip because of required high breakdown voltage capabilities, the present approach allows for an integrated design within an integrated circuit to support single chip designs and applications for radio transceivers. FIG. 6 below illustrates a low voltage breakdown switch configuration that can operably withstand voltage swings that exceed the breakdown voltage level of the switch.

FIG. 6 is a functional block diagram that illustrates formation and use of an N type MOSFET switch module that includes an N type MOSFET 304 in a substrate well 308 for decoupling a power amplifier from an antenna according to one embodiment of the invention. Typically, N type MOSFET transistors are formed within a substrate material wherein the source and drain terminals are oppositely doped regions within the substrate material. As may be seen, MOSFET 304 (shown within the dashed rectangle) includes two n+ regions 312 and 316 formed within a P-well 320. A metal gate 324 is shown separated from the two n+ wells 312 and 316 to demonstrate junction capacitance there between the gate 324 and the n+ wells 312 and 316 that form the source and drain regions of the semiconductor device (isolated switch module 300). As may further be seen, the P-well 320 that houses the MOSFET 304 itself is formed within an N-well (shown as Dn well 328) which in turn is formed within the P-type substrate 332. As may be seen, therefore, the well 320 holding MOSFET 304 is isolated from substrate 332 and any biasing therein.

As may also be seen, each terminal (source, gate, drain body and deep N-well) includes a bias source and a bias resistor between the bias source and the corresponding terminal. Further, according to an operational aspect of the present embodiment, a bias voltage for the source and drain are kept higher than the body. As such, the junction diode(s) between the source/drain and the body remain reverse biased to provide high impedance for any signal path. Along similar lines, the base well holding the MOSFET is also biased albeit at a much lower level than a bias for the N-well that surrounds the P-well that houses the MOSFET, which further increases the impedance for any signal path to the substrate and therefore reduces the insertion loss by the MOSFET. In one embodiment, the following bias levels are utilized:

substrate=0 volts
    body well (P-well housing the MOSFET)=1 volt
    source=1.5 volts
    drain=1.5 volts
    gate=2.5 volts
    Dn well (N-well housing base well)=3.3 volts Generally, the above listed bias voltages reflect but one embodiment. These voltages may be modified. One aspect of the present structure, however, is that MOSFET 304 is isolated from substrate and bias voltages used for other transceiver circuit components. As such, MOSFET 304 operably floats with a signal swing of an output signal of a power amplifier. Thus, even though the signal swing may substantially surpass the breakdown voltage (e.g., between the gate and source) of the MOSFET 304, the structure of FIG. 6 prevents such breakdown from occurring since MOSFET 304 floats with the voltage swing. Returning to the discussion of the bias levels, therefore, modifications to the bias voltages should be undertaken carefully to preserve the reverse diode bias signal levels that are required to allow the MOSFET to float with the signal swing.

Because terminals of MOSFET 304 are isolated from substrate 332 and an associated bias levels, the terminals of MOSFET 304 all swing together with the input signal to maintain a difference in voltages across the terminals (e.g., gate-to-source) that is less than the breakdown voltage value of the device. Generally, this desirable result is based upon the NMOS device being formed in a P-well that in turn is within a Dn-well to allow the P-well to and MOSFET body to be biased at a different level than the substrate that houses the power amplifier. This isolation/separate biasing thus operably protects the junctions of the MOSFET device without requiring thick oxide layers and thus allow the MOSFET device to be formed on-chip. It should be understood that the effective isolation may also be achieved with differently doped regions than what is shown here in FIG. 6.

The structure of FIG. 6 further illustrates boundary diode between the P-well 320 and N-well 324, between the N-well 328 and the P-substrate 332 and, of course, between the n+ wells 312 and 316 that form the source and drain regions of MOSFET 304 and the P-well 320 within which the are formed. Finally, a junction capacitance is shown between the metal gate 324 and the P-well 320 housing the drain and substrate.

Figure 7:
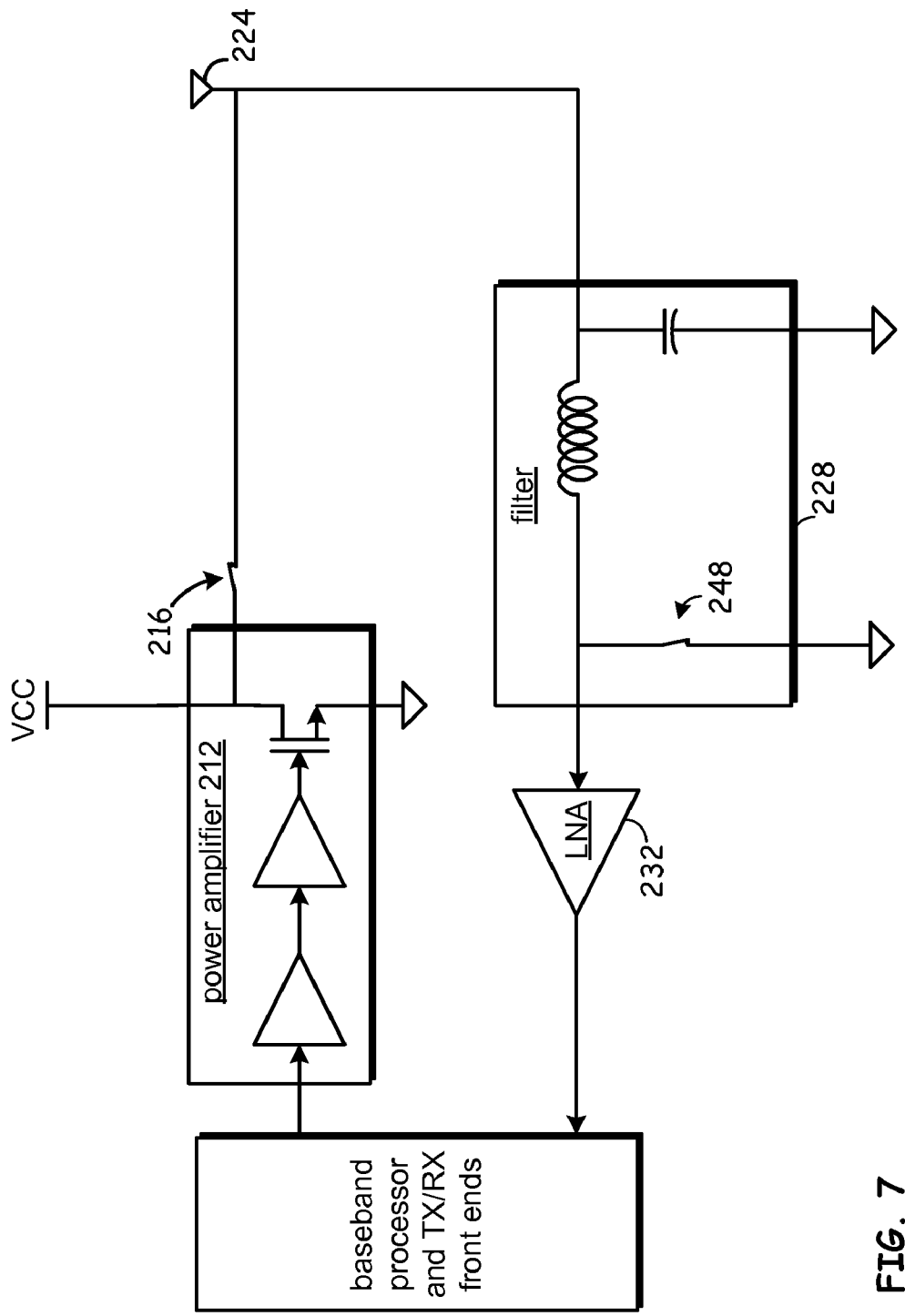
FIGS. 7 and 8 are functional schematic diagrams that illustrate resulting topologies for transmit and receive modes of operation based upon switch positions as driven by the transmit-receive logic according to one embodiment of the invention.
Figure 8:
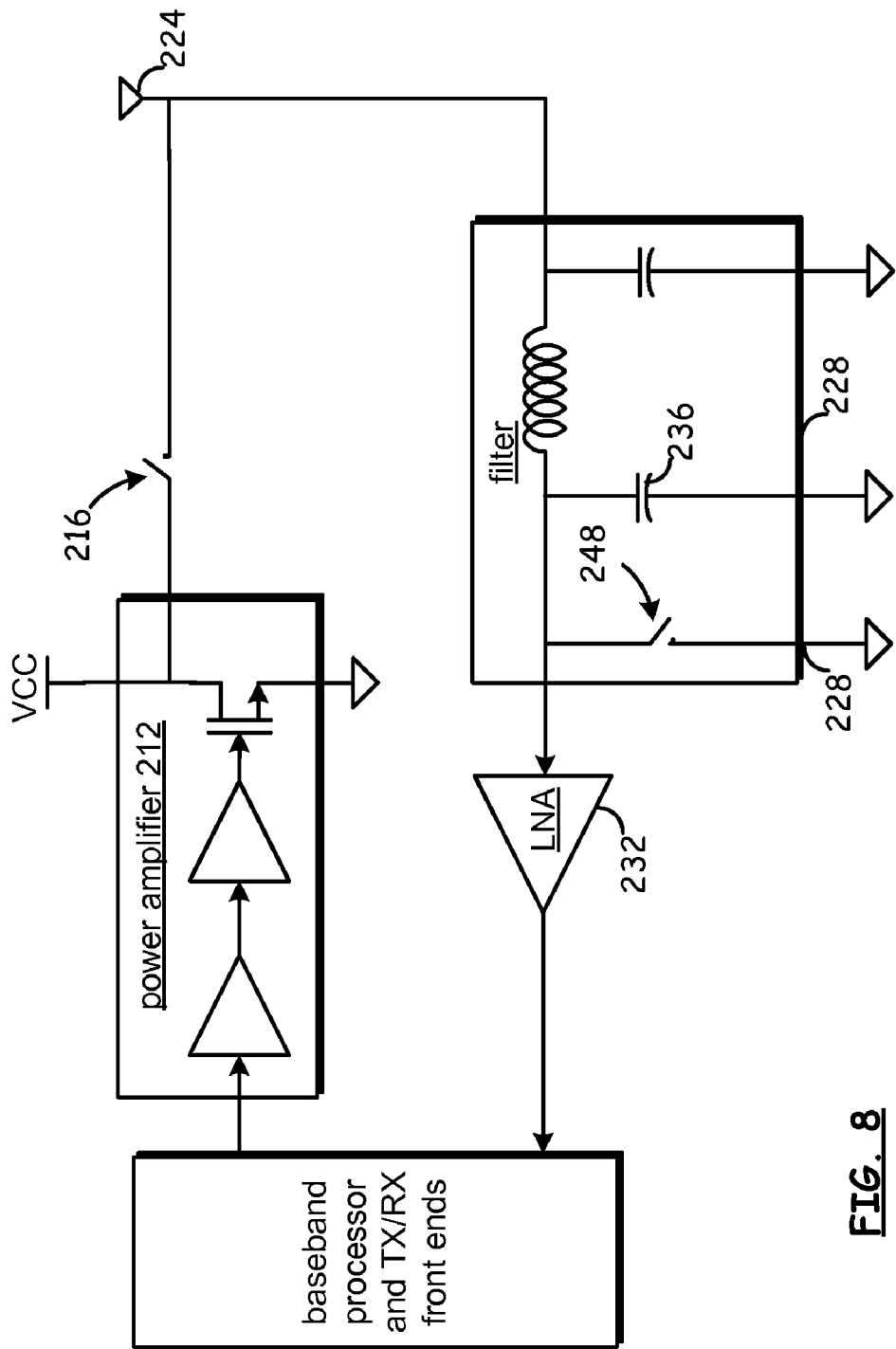

FIGS. 7 and 8 are functional schematic diagrams that illustrate resulting topologies for transmit and receive modes of operation based upon switch positions as driven by the transmit-receive logic of FIG. 5 according to one embodiment of the invention. FIGS. 7 and 8 are primarily intended to clarify operation of the embodiments and corresponding method of FIGS. 5 and 6. In a transmit mode of operation when switches 216 and 248 are closed, an effective topology is illustrated in FIG. 7. More specifically, the power amplifier 212 produces an amplified output to RF port 224. At the same, filter 228 is reconfigured from a Pi-Match network to a parallel LC filter that resonates to produce a very high impedance for any signal at the antenna (e.g., the output signal produced by power amplifier 212). As such, the output of amplifier 212 is radiated from the antenna and is not conducted to LNA 248. As may be seen, the output of filter 228 is coupled to ground as is the input of LNA 232 during the transmit mode of operation. The suggested embodiment of power amplifier 212 is of a 3 stage amplifier with a current driver MOSFET at the output stage. It should be understood that this is exemplary and that any known on-chip power amplifier configuration may be used.

In contrast to FIG. 7, FIG. 8 illustrates the receive mode of operation. Here, an open is created between the power amplifier 212 and RF port 224 effectively disabling signal path between power amplifier, RF port 224, and receive path circuitry comprising filter 228 and LNA 232. Filter 228 is reconfigured into the Pi-Match network by opening switch 248 coupled across the output node of filter 228 and circuit common. More specifically, switch 248 is coupled across the capacitive element 236 on the output side of the Pi-Match network of filter 228. In a Pi-Match network configuration, an impedance match at frequency band of interest for ingoing RF signals is provided to allow such signals to pass to LNA 232. As such, no signals are transmitted down the transmit path and all signals received at RF port 224 are produced through the Pi-Match network of filter 228 to LNA 232.

Figure 9:
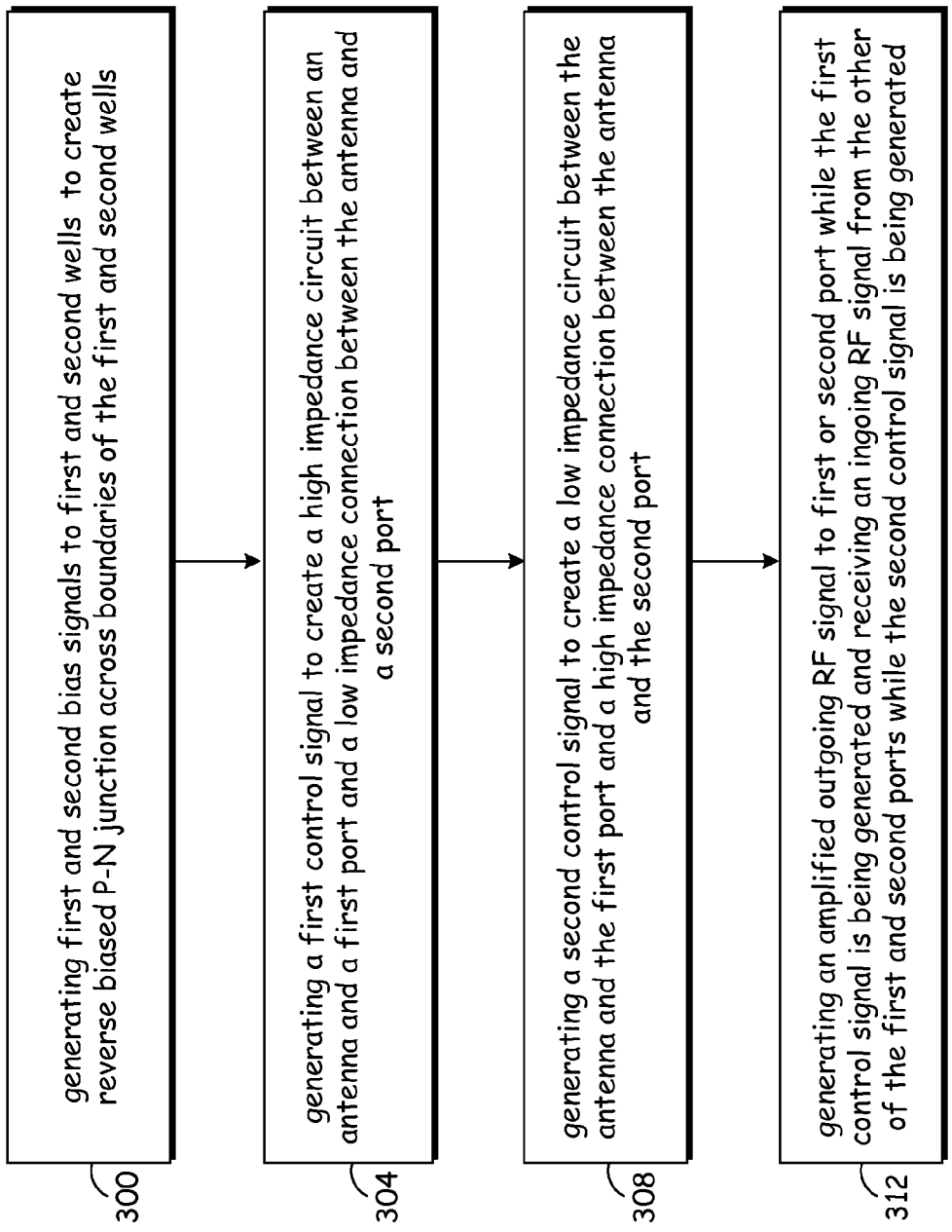
FIG. 9 is a flow chart that illustrates a method for selecting between outgoing and in-going radio frequency signals between an antenna and transmit and receive path circuitry, respectively, according to one embodiment of the invention.

FIGS. 8 and 9 illustrate a method for selecting between outgoing and in-going radio frequency signals between an antenna and transmit and receive path circuitry, respectively, according to one embodiment of the invention. Generally, the method allows, but does not require, operationally biasing an output stage amplifier for amplifying outgoing radio frequency signals and a low noise amplifier for amplifying in going radio frequency signals wherein both amplifiers are formed on the same integrated circuit with radio transceiver circuitry. Generally, during an operational mode, it is desirable to maintain the output and input amplifiers in a biased state to reduce settle time for fast signal processing. Stated differently, especially with respect to the output stage power amplifier, such devices are not required to be turned off to avoid a breakdown voltage of a controlling on-chip transistor operating as a switch for transmit-receive switch operations. Since one aspect of the embodiments of the invention includes a MOSFET module structure that allows the MOSFET to float with a signal to avoid a breakdown voltage, a second aspect includes applying proper bias voltage to create desired reverse biased diode between the junctions of the wells and substrate. Thus, a one step of the method includes generating first and second bias signals to first and second wells to create reverse biased P-N junction across boundaries of the first and second wells (step 300). More specifically, this step requires generating first and second bias signals to first and second wells formed about a MOSFET switch to create reverse biased P-N junction across the boundary between the first and second wells and between the second well and one of a third well or substrate having a common boundary with the second well. The method also includes generating a first of two control signals to create a high impedance circuit between an antenna and a first port of a transmit-receive module and a low impedance connection between the antenna and a second port of the transmit-receive module during a first mode of operation (step 304). Moreover, the method includes generating the second of the two control signals to create an impedance matched circuit between the antenna and the first port of a transmit-receive module and a high impedance connection between the antenna and the second port of the transmit-receive module during a second mode of operation (step 308). Finally, the method includes generating an amplified outgoing RF signal to one of the first and second ports while the first control signal is being generated and receiving an ingoing RF signal from one of the first and second ports while the second control signal is being generated (step 312).

To illustrate, if a first mode of operation is the transmit mode, the first control signal would operably close the connection between a power amplifier and an antenna such as power amplifier 212 and RF port 224 of FIG. 5 and would close the connection between node coupling the low noise amplifier input and the filter output to circuit common to short an output stage capacitor of a low impedance filter to create a high impedance filter or circuit to isolate the low noise amplifier 232 from signals at the RF port 224. Additionally, the second control signal would operably open the connection between node coupling the low noise amplifier input and the filter output to circuit common to allow the filter to operate as an impedance matched circuit for a desired frequency band to allow the low noise amplifier 232 to receive signals received at the RF port 224.

In operation, therefore, the method includes the MOSFET switch of the MOSFET switch module electrically floating with the outgoing RF signal. With the present method and circuitry, a small scale MOSFET device may be used having a low breakdown voltage. Thus, large magnitude outgoing RF signals do not create a break down condition for the MOSFET as the switch electrically floats with the outgoing RF signal.

The method and circuitry allows, therefore, for the MOSFET to be formed on-chip instead of off-chip as with conventional designs and approaches.

The discussion of the preceding Figures of the present specification generally teach an approach for using an on-chip switch with low voltage break down characteristics to control signal flow during transmit and receive operations. Generally, a low breakdown switch formed on-chip is used to switch between transmit and receive operations and is configured within a module that does isolates the switch from substrate biasing signals and/or circuit common to not expose the device to voltage swings that exceed its breakdown voltage. As such, signal swings are limited to the value of the supply voltage source. In more traditional approaches, a typical amplified signal creates a breakdown voltage condition for on-chip switches. Accordingly, such switches are typically included with off-chip circuitry.

Figure 10:
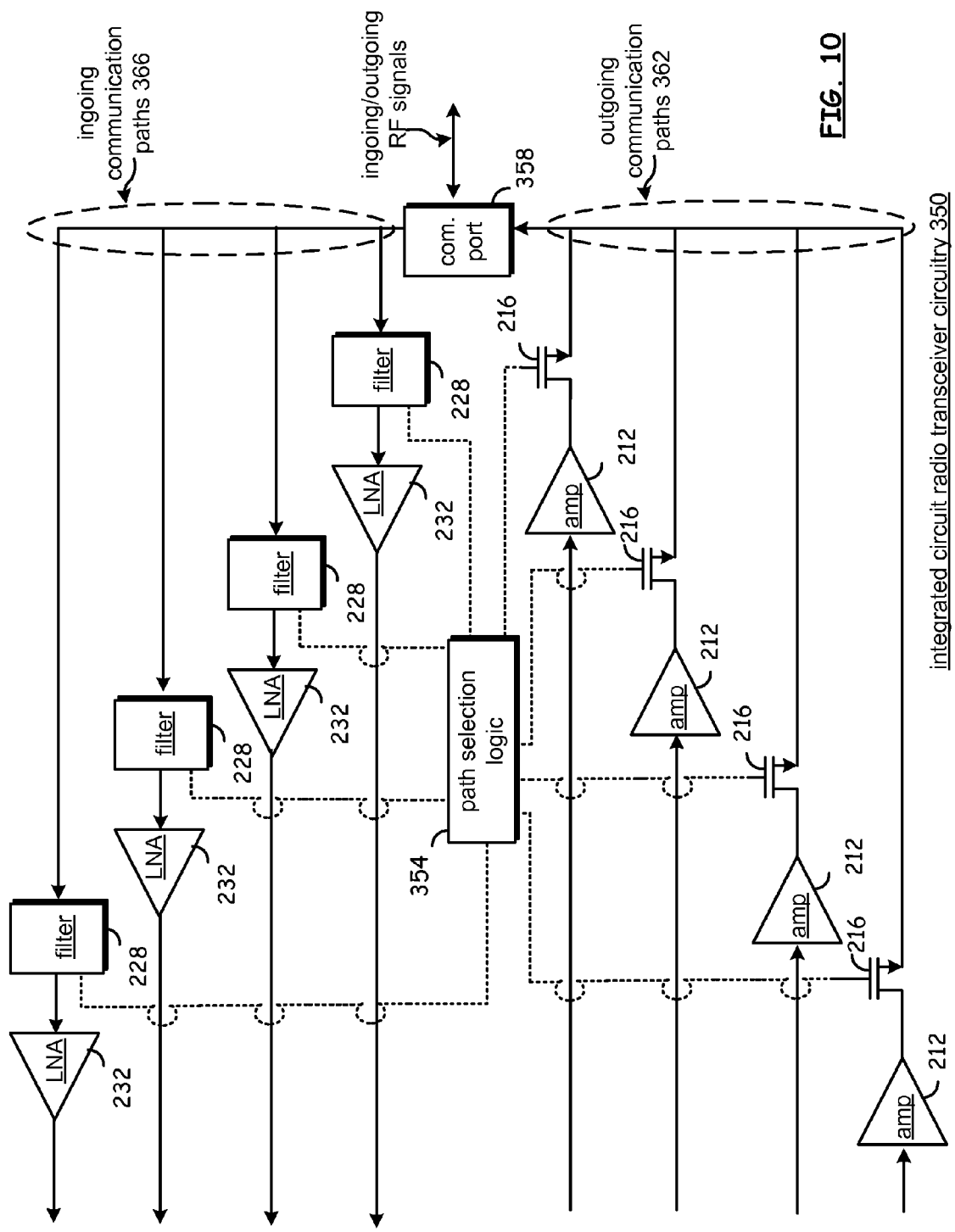
FIG. 10 is a functional block diagram of switching logic formed in accordance with one embodiment of the invention.

FIG. 10 is a functional block diagram of switching logic formed in accordance with one embodiment of the invention in which plurality of outgoing communication paths and a plurality of ingoing communication paths are selectably coupled to an ingoing/outgoing signal path. For purposes herein, each communication path comprises communication circuitry operable to process either outgoing or ingoing radio frequency signals. In the specific example, radio transceiver circuitry is shown though other types of communication circuit elements may readily be substituted therefor. As may be seen, integrated circuit radio transceiver circuitry 350 includes path selection logic 354 that is operably disposed to provide control signals to operably select a corresponding communication path for communicating through communication port 358.

Communication port 358 may comprise an antenna, an RF port, or more generally, a communication port through which at least one communication circuit of a communication path provides an amplified signal that exceeds breakdown voltages of on-chip switch devices (e.g., on-chip MOSFETs). For example, for each of the four outgoing communication paths shown at 362, path selection logic 354 is operable to provide a bias signal (as a control signal) to MOSFET 216 (as described before) to selectively couple a corresponding amplifier 216 to communication port 358. Similarly, for each of the four ingoing communication paths shown at 366, path selection logic 354 is operable to provide a bias signal (as a control signal) to filter 228 (as described before) to selectively couple a corresponding low noise amplifier 232 to communication port 358. As before, the control signal provided to filter 228 is a bias signal to a MOSFET (e.g., MOSFET 248 of FIG. 5) but is not shown here because of space limitations The path selection logic 254 comprises communication selection switch circuitry coupled communication circuit elements of the communication paths, the communication selection switch circuitry comprising at least one isolated MOSFET device operable to perform specified switching. Thus, if a communication circuit element (e.g., amplifier 212) provides a signal that exceeds the breakdown voltage of MOSFET 216, the isolated nature of MOSFET 216 allows the communication circuit element to remain operation without breakdown As described previously, the utilization of isolated MOSFETs 216, formed similarly to isolated MOSFET switch module 300 of FIG. 6, and the utilization of a Pi-Match filter with a MOSFET 248 (or the equivalent) allows the communication selection switch circuitry to isolate one first communication circuit on a communication path from another communication circuit on another communication path. One aspect to note is that all of the circuit elements shown in FIG. 10 are formed on the same dielectric substrate (e.g, same die).

Further, the communication path circuits do not necessarily need to be transceiver circuits. For example, the communication circuits may comprises a transmit path communication circuit, a tuning circuit, or a signal generator circuit, or an amplification circuit. More generally, FIG. 10 illustrates that the use of operably configurable filters to selectively provide coupling and de-coupling for a specified frequency range and the use of isolated MOSFETs to float with signals that exceed breakdown voltages allows the implementation of on-chip switching circuitry for applications that previously required off-chip switches formed to have higher breakdown voltage ratings.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. An integrated circuit transceiver, comprising:
baseband processor for generating outgoing data and for processing ingoing data;
analog front end for producing an outgoing RF signal from the outgoing data and for producing the ingoing data from a received ingoing RF signal;
a power amplifier operably coupled to receive the outgoing RF signal to produce a power amplified outgoing RF signal;
a radio frequency port for transmitting the power amplified outgoing RF signal and for receiving the ingoing RF signal;
an on chip CMOS transmit-receive module operably coupled between the power amplifier and antenna on a transmit path and between the RF front end and the radio frequency port on a receive path;
logic for producing a transmit-receive mode indication to the transmit-receive module to prompt the transmit-receive module to be configured in to a corresponding transmit or receive mode, wherein the transmit-receive module, based upon the mode indication, generates first and second bias signals to first and second wells formed about a MOSFET switch to create reverse biased junction across the boundary between the first and second wells and between the second well and one of a third well or substrate having a common boundary with the second well; and wherein the transmit-receive module further comprises switching circuitry for:

during the transmit mode, closing a connection between the power amplifier and the antenna and for creating a high impedance circuit between the analog front end receive path and the radio frequency port; and during the receive mode, opening the connection between the power amplifier and the radio frequency port and for creating a low impedance circuit between the analog front end receive path and the radio frequency port.

2. The integrated circuit transceiver of claim 1 wherein the switching circuitry comprises a MOSFET formed within a plurality of wells within a substrate.

3. The integrated circuit transceiver of claim 2 wherein each of the plurality of wells is biased by a supply to create a reversed bias diode between the boundaries of the wells and substrate to create a capacitive device between the wells and substrate at the boundaries.

4. The integrated circuit transceiver of claim 3 further including a large resistive element operably coupled between the supply and the plurality of wells.

5. The integrated circuit transceiver of claim 2 wherein the MOSFET is an N-type MOSFET, a first well within which the MOSFET is formed is a P-type well and a second well within which the first well is formed is an N-type well.

6. The integrated circuit transceiver of claim 5 wherein the second well forms an outer boundary with the substrate of the integrated circuit.

7. The integrated circuit transceiver of claim 5 further comprising a third well oppositely doped in relation to the second well wherein the second well is formed within the third well.

8. The integrated circuit transceiver of claim 1 wherein the radio frequency port comprises an antenna.

9. The integrated circuit transceiver of claim 1 wherein the radio frequency port comprises a communication port coupled to a wired transmission line for a high power wired communication.

10. An integrated circuit transceiver, comprising:

baseband processor for generating outgoing data and for processing ingoing data;

analog front end for producing an outgoing RF signal from the outgoing data and for producing the ingoing data from a received ingoing RF signal;

a power amplifier operably coupled to receive the outgoing RF signal to produce a power amplified outgoing RF signal;

an antenna for transmitting the power amplified outgoing RF signal and for receiving the ingoing RF signal;

an on chip CMOS transmit-receive module operably coupled between the power amplifier and antenna on a transmit path and between the analog front end and the antenna on a receive path;

logic for producing a transmit-receive mode indication to the transmit-receive module to prompt the transmit-receive module to be configured in to a corresponding transmit or receive mode;

wherein the transmit-receive module further comprises:

an impedance block including an inductive element disposed between parallel coupled capacitive elements wherein the impedance block is operably disposed between the antenna and the analog front end and the antenna;

first switching circuitry operably disposed to short one of the parallel coupled capacitive elements based upon the transmit-receive mode indication; and second switching circuitry operably disposed to couple the power amplifier to the antenna based upon the transmit-receive mode indication;

wherein the first switching circuitry shorts one of the capacitive elements to create a high impedance path between the antenna and the receive path of the analog front end and a wherein the second switching circuitry creates low impedance connection between the power amplifier and the antenna during a transmit mode of operation based upon the transmit-receive mode indication; and wherein the first switching circuitry operably disposed across the one of the capacitive elements is opened to create an impedance match between the antenna and the receive path of the analog front end and a wherein the second switching circuitry creates an open connection between the power amplifier and the antenna during a receive mode of operation based upon the transmit-receive mode indication.

11. The integrated circuit transceiver of claim 10 wherein at least one of the first and second switching circuitry comprises a MOSFET formed within a first well that is further formed within a second well that is further formed within a substrate.

12. The integrated circuit transceiver of claim 11 wherein each of the first and second wells is biased to create a reversed bias diode between the boundaries of the first and second wells and between the second well and the substrate.

13. The integrated circuit transceiver of claim 12 further including a large resistive element operably coupled between each of the first and second wells and a corresponding bias signal.

14. The integrated circuit transceiver of claim 13 wherein the bias signal provided to second well has a greater magnitude that the bias signal for the first well.

15. The integrated circuit transceiver of claim 13 wherein the bias signal provided to second well has a magnitude that is greater than or equal to 1.5 volts and wherein the bias signal for the first well is less than or equal to one volt.

16. The integrated circuit transceiver of claim 11 wherein the MOSFET is an N-type MOSFET, the first well is a P-type well and the second well is an N-type well.

17. The integrated circuit transceiver of claim 11 further comprising a third well oppositely doped from the second well wherein the second well is formed within the third well.

18. An integrated circuit transceiver, comprising:

a first communication circuit;

a second communication circuit;

communication selection switch circuitry coupled to the first and second communication circuits, the communication selection switch circuitry comprising at least one isolated MOSFET device operable to perform specified switching and is further operable to selectively isolate the first communication circuit from the second communication circuit, the communication selection switch circuitry generating first and second bias signals to first and second wells formed about a MOSFET switch to create reverse biased P-N junction across the boundary between the first and second wells and between the second well and one of a third well or substrate having a common boundary with the second well; and wherein the communication selection switch circuitry and the first and second communication circuits are all formed on the same dielectric substrate.

19. The integrated circuit transceiver of claim 18 wherein at least one of the first and second communication circuits is operable to produce a signal that exceeds a breakdown voltage of the at least one isolated MOSFET device.

20. The integrated circuit transceiver of claim 18 wherein at least one of the first and second communication circuits comprises one of a transmit path communication circuit, a tuning circuit, or a signal generator circuit, or an amplification circuit.

21. The integrated circuit transceiver of claim 18 wherein the communication selection switch circuitry is operable to select between multiple transmit paths.

22. The integrated circuit transceiver of claim 18 wherein the communication selection switch circuitry is operable to select between multiple receive paths.

23. The integrated circuit transceiver of claim 18 wherein the communication selection switch circuitry is operable to select between multiple transmit paths and multiple receive paths.

24. A method for delivering a power amplified outgoing radio frequency signal to an antenna during a transmit mode of operation and for delivering an in-going radio frequency signal to receive path of an analog front end, comprising:

generating first and second bias signals to first and second wells formed about a MOSFET switch to create reverse biased P-N junction across the boundary between the first and second wells and between the second well and one of a third well or substrate having a common boundary with the second well;

generating a first of two control signals to create a high impedance circuit between an antenna and a first port of a transmit-receive module and a low impedance connection between the antenna and a second port of the transmit-receive module during a first mode of operation;

generating the second of the two control signals to create a low impedance circuit between the antenna and the first port of a transmit-receive module and a high impedance connection between the antenna and the second port of the transmit-receive module during a second mode of operation; and generating an amplified outgoing RF signal to one of the first and second ports while the first control signal is being generated and receiving an ingoing RF signal from one of the first and second ports while the second control signal is being generated.

25. The method of claim 24 further including shorting a capacitive element to create the high impedance circuit.

26. The method claim 24 further including operably coupling a capacitive element to create the low impedance circuit.

27. The method of claim 24 wherein the MOSFET switch electrically floats within the outgoing RF signal.

28. The method of claim 27 wherein the MOSFET is a small scale device and whereby large magnitude outgoing RF signals do not create a break down condition for the MOSFET as the switch electrically floats with the outgoing RF signal.

* * * * *

UNITED STATES PATENT AND TRADEMARK OFFICE
CERTIFICATE OF CORRECTION

| | | |
|---|---|---|
| PATENT NO. | : 7,865,149 B2 | Page 1 of 1 |
| APPLICATION NO. | : 11/762790 | |
| DATED | : January 4, 2011 | |
| INVENTOR(S) | : Yiping Han | |

It is certified that error appears in the above-identified patent and that said Letters Patent is hereby corrected as shown below:

Col. 16, line 23, in Claim 10: after "front end and" delete "a"

Col. 16, line 43, in Claim 14: replace "that" with --than--

Signed and Sealed this
Twenty-first Day of August, 2012

David J. Kappos
*Director of the United States Patent and Trademark Office*